(12) United States Patent
Wallrath

(10) Patent No.: US 12,514,240 B1
(45) Date of Patent: Jan. 6, 2026

(54) SHORELINE WALKER

(71) Applicant: Ronald Wallrath, Mountain Home, AR (US)

(72) Inventor: Ronald Wallrath, Mountain Home, AR (US)

( * ) Notice: Subject to any disclaimer, the term of this patent is extended or adjusted under 35 U.S.C. 154(b) by 0 days.

(21) Appl. No.: 19/194,329

(22) Filed: Apr. 30, 2025

(51) Int. Cl.
*A01K 85/00* (2006.01)

(52) U.S. Cl.
CPC ...... *A01K 85/1843* (2022.02); *A01K 85/1837* (2022.02); *A01K 85/1841* (2022.02); *A01K 85/1851* (2022.02); *A01K 85/1857* (2022.02); *A01K 85/1867* (2022.02)

(58) Field of Classification Search
CPC ............ A01K 85/1841; A01K 85/1843; A01K 85/1857; A01K 85/1851; A01K 85/1837; A01K 85/1867; A01K 85/00; A01K 91/08
USPC ........... 43/42.22, 42.23, 42.08, 42.39, 42.36, 43/42.49, 42.09, 43.13, 43.12
See application file for complete search history.

(56) References Cited

U.S. PATENT DOCUMENTS

| | | | | | |
|---|---|---|---|---|---|
| 165,867 | A | * | 7/1875 | Quinn | A01K 91/08 43/43.13 |
| 900,139 | A | * | 10/1908 | Welch et al. | A01K 91/08 43/43.13 |
| 1,304,983 | A | * | 5/1919 | Howerton | A01K 91/08 43/43.13 |
| 1,606,240 | A | * | 11/1926 | Klaserner | A01K 93/00 43/43.13 |
| 1,813,843 | A | * | 7/1931 | Flood | A01K 85/16 43/42.49 |
| 1,955,408 | A | * | 4/1934 | Chapleau | A01K 85/16 43/42.36 |
| 2,149,054 | A | * | 2/1939 | Jones | A01K 85/16 43/42.22 |
| 2,249,382 | A | * | 7/1941 | Henriksen | A01K 91/08 43/43.13 |
| 2,255,465 | A | * | 9/1941 | Hickey | A01K 91/08 43/43.13 |
| 2,274,596 | A | * | 2/1942 | Fink | A01K 85/16 43/42.22 |
| 2,327,789 | A | * | 8/1943 | Hixon | A01K 93/00 43/43.13 |

(Continued)

FOREIGN PATENT DOCUMENTS

| | | | | |
|---|---|---|---|---|
| CA | 2903045 A1 | * | 3/2016 | |
| JP | 2021103951 A | * | 7/2021 | ............ A01K 85/16 |

*Primary Examiner* — Darren W Ark
(74) *Attorney, Agent, or Firm* — Dale J. Ream

(57) ABSTRACT

A shoreline fishing lure includes a lure body having a pair of side portions that, together, define an interior area and an upper slit in communication with the interior area. An insert member is positioned in the interior area and includes an upper section extending upwardly through the slit and defines a plurality of harness holes arranged along front and upper edges of the insert member. The insert member includes a weight mechanism proximate a lower edge of the insert member that is configured to selectively modify the lures body's buoyancy. The fishing lure includes a wire harness having an upper prong selectively extending through a selected harness hole, the wire harness having a predetermined contoured configuration that, when attached to the selected harness hole, modifies the direction and movement of the lure body in response to water resistance.

14 Claims, 7 Drawing Sheets

(56) References Cited

U.S. PATENT DOCUMENTS

| | | | | |
|---|---|---|---|---|
| 2,545,185 A * | 3/1951 | Winslow | A01K 91/08 | 43/42.22 |
| 2,556,423 A * | 6/1951 | Gross | A01K 91/08 | 43/43.13 |
| 2,572,427 A * | 10/1951 | Anglim | A01K 91/08 | 43/43.13 |
| 2,595,947 A * | 5/1952 | Jones | A01K 93/00 | 43/43.13 |
| 2,597,288 A * | 5/1952 | Caldwell | A01K 93/00 | 43/43.12 |
| 2,597,317 A * | 5/1952 | Gross | A01K 85/14 | 43/42.49 |
| 2,685,145 A * | 8/1954 | Dean | A01K 85/18 | 43/42.15 |
| 2,715,790 A * | 8/1955 | Carpenter | A01K 85/16 | 43/42.22 |
| 2,825,994 A * | 3/1958 | Bruhn | A01K 91/08 | 43/43.13 |
| 2,920,414 A * | 1/1960 | Koepplin | A01K 93/00 | 43/43.13 |
| 2,924,907 A * | 2/1960 | Hamilton | A01K 91/08 | 43/42.22 |
| 2,933,848 A * | 4/1960 | Tollefson | A01K 91/08 | 43/43.13 |
| 3,134,189 A * | 5/1964 | Hubbart | A01K 91/08 | 43/43.13 |
| 3,142,929 A * | 8/1964 | Killilea | A01K 91/08 | 43/43.13 |
| 3,199,244 A * | 8/1965 | Frederiksen, Sr. | A01K 85/02 | 43/42.36 |
| 3,269,051 A * | 8/1966 | Saunders, Jr. | A01K 95/00 | 43/43.12 |
| 3,401,483 A * | 9/1968 | Bellah | A01K 93/00 | 43/42.47 |
| 3,453,768 A * | 7/1969 | Feaster | A01K 85/01 | 43/42.35 |
| 3,464,142 A * | 9/1969 | Hubbart | F16B 45/036 | 43/42.22 |
| 3,483,651 A * | 12/1969 | Borger | A01K 85/16 | D22/128 |
| 3,568,355 A * | 3/1971 | Hassell | A01K 95/00 | 43/43.15 |
| 3,760,762 A * | 9/1973 | Spongberg | A01K 91/08 | 43/43.13 |
| 3,943,653 A * | 3/1976 | Reckler | A01K 91/08 | 43/43.13 |
| 4,037,348 A * | 7/1977 | Kruger | A01K 85/16 | 43/42.49 |
| 4,461,115 A * | 7/1984 | Carrillo | A01K 93/00 | 43/43.13 |
| 4,464,858 A * | 8/1984 | Wright | A01K 91/06 | 43/43.13 |
| 4,486,970 A * | 12/1984 | Larson | A01K 91/08 | 43/43.13 |
| 4,745,699 A * | 5/1988 | Gage | A01K 85/16 | 43/42.36 |
| 4,745,702 A * | 5/1988 | Koch | A01K 91/08 | 43/43.13 |
| 4,763,437 A * | 8/1988 | Cuda | A01K 91/02 | 43/17 |
| 5,303,499 A * | 4/1994 | Miller | A01K 95/00 | 43/43.15 |
| 5,615,513 A * | 4/1997 | Luna | A01K 91/06 | 43/43.13 |
| 5,636,467 A * | 6/1997 | Adams | A01K 91/08 | 43/42.22 |
| 5,680,726 A * | 10/1997 | Sassone | A01K 83/00 | 43/43.16 |
| 5,829,184 A * | 11/1998 | Studanski | A01K 91/08 | 43/43.13 |
| 5,992,083 A * | 11/1999 | Deng | A01K 85/16 | 43/42.15 |
| 6,173,522 B1 * | 1/2001 | Couch | A01K 85/16 | 43/42.22 |
| 7,213,363 B2 * | 5/2007 | Lieb | A01K 93/00 | 43/43.13 |
| 7,337,579 B2 * | 3/2008 | Thomas | A01K 85/16 | 43/42.32 |
| 7,380,366 B1 * | 6/2008 | Barrow | A01K 91/08 | 43/42.22 |
| 7,637,051 B2 * | 12/2009 | Emory | A01K 91/08 | 43/43.13 |
| 9,930,876 B2 * | 4/2018 | Solberg | A01K 93/00 | |
| 10,321,668 B1 * | 6/2019 | Cornelison | A01K 85/00 | |
| 2001/0049900 A1 * | 12/2001 | Peck | A01K 85/16 | 43/42.39 |
| 2002/0170226 A1 * | 11/2002 | Martinsen | A01K 91/08 | 43/43.13 |
| 2002/0174593 A1 * | 11/2002 | Siirtola | A01K 85/16 | 43/42.53 |
| 2003/0084602 A1 * | 5/2003 | Reed | A01K 85/00 | 43/42.39 |
| 2004/0107628 A1 * | 6/2004 | Mueller | A01K 85/16 | 43/42.39 |
| 2005/0172539 A1 * | 8/2005 | Lieb | A01K 93/00 | 43/44.87 |
| 2008/0313949 A1 * | 12/2008 | Lee | A01K 93/00 | 43/43.13 |
| 2011/0197492 A1 * | 8/2011 | Fowler | A01K 91/08 | 43/4.5 |
| 2012/0272563 A1 * | 11/2012 | Baker | A01K 85/18 | 43/42.22 |
| 2014/0190064 A1 * | 7/2014 | Fellbaum | A01K 85/16 | 43/42.09 |
| 2017/0112114 A1 * | 4/2017 | Sykes | A01K 91/08 | |
| 2017/0295769 A1 * | 10/2017 | Solberg | A01K 91/08 | |
| 2024/0049695 A1 * | 2/2024 | Xiao | A01K 85/029 | |

* cited by examiner

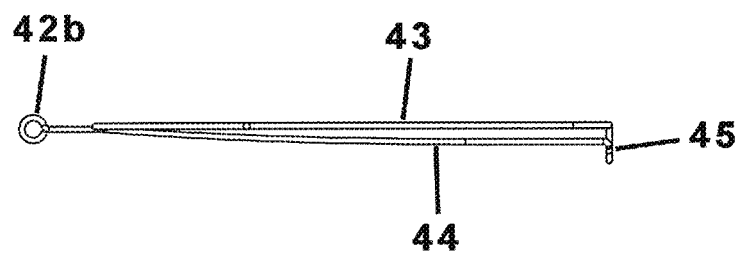
Fig. 5a
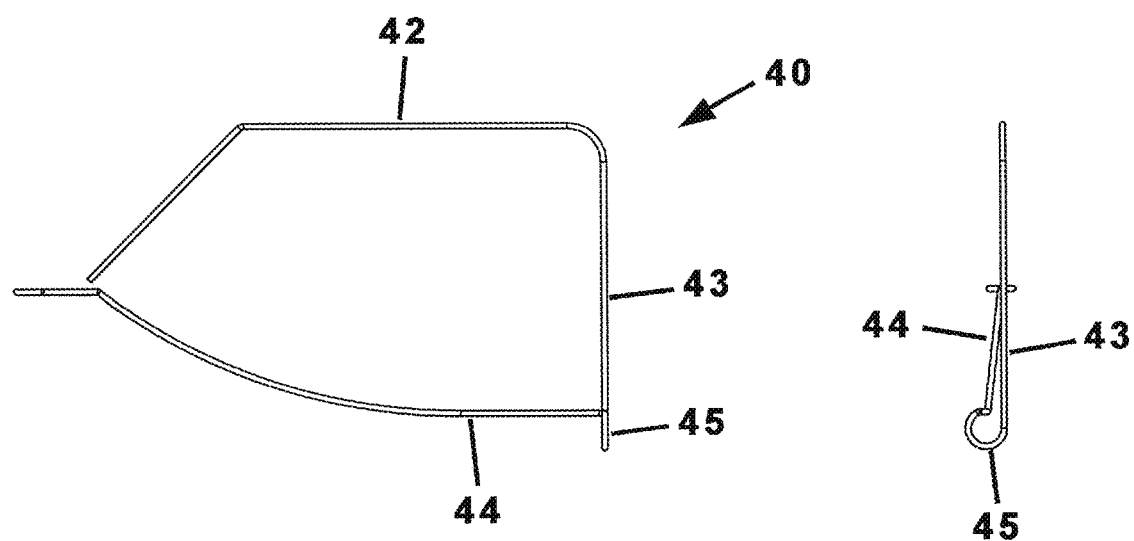
Fig. 5b
Fig. 5c

SHORELINE WALKER

BACKGROUND OF THE INVENTION

This invention relates generally to fishing lures and, more particularly, to a fishing lure that once cast into a body of water a distance beyond a shoreline moves laterally in the water and generally parallel to the shoreline as it is reeled back to a fisherman's pole.

Traditional fishing lures are designed to be cast out into a body of water and then retrieved in a generally linear path back toward the fisherman. The effectiveness of this method relies on the strike zone created by the distance of the cast and the duration the lure remains in the water. During retrieval, the lure mimics the movement of prey, enticing fish to strike before it reaches the fisherman's position. The farther the cast, the longer the lure remains in the strike zone, increasing the chances of catching fish.

However, traditional lure fishing presents significant challenges when fishing near the shoreline, around weed beds, or in areas covered with moss. In these environments, a fisherman must make numerous short casts to cover the desired area while avoiding snags on underwater vegetation. The short retrieval paths of these casts limit the time the lure remains in the strike zone, reducing the opportunity for fish to strike. This makes shoreline fishing inefficient, as it requires a constant cycle of casting and retrieving, increasing effort and fatigue while reducing the potential for success.

Additionally, frequent casting near obstacles increases the likelihood of the lure becoming entangled in weeds, submerged branches, or moss, leading to frustrating interruptions and potential loss of the lure. Fishermen must often adjust their retrieval speed and technique to navigate these obstacles, further complicating the process and reducing the effectiveness of traditional lures in these conditions.

To address these limitations, there is a need for a fishing lure designed to move laterally or parallel to the shoreline rather than in a direct line back to the fisherman. Such a lure would remain in the strike zone for a longer duration, even with shorter or moderate-length casts. This configuration allows fishermen to efficiently cover more area without the need for excessive casting and retrieving. By increasing the lure's exposure in prime fishing areas with minimal effort, this design could significantly improve catch rates and overall fishing efficiency.

A lure with lateral movement capabilities would provide an innovative solution for shoreline fishing, enabling anglers to target fish more effectively in areas that are traditionally challenging due to weeds, moss, or shallow structures. This advancement would reduce the need for constant repositioning and repeated casting while maximizing the lure's presence in optimal fishing zones.

SUMMARY OF THE INVENTION

Accordingly, a shoreline fishing lure according to the present invention includes a lure body having a pair of side portions that, together, define an interior area and an upper slit in communication with said interior area. An insert member is positioned in the interior area and includes an upper section extending upwardly through said slit and defines a plurality of harness holes arranged along front and upper edges of the insert member. The insert member includes a weight mechanism proximate a lower edge of the insert member that is configured to selectively modify the lures body's buoyancy. In a critical aspect, the fishing lure includes a wire harness having an upper prong selectively extending through a selected harness hole, the wire harness having a predetermined contoured configuration that, when attached to the selected harness hole, modifies the direction and movement of the lure body in response to water resistance.

Therefore, a general object of this invention is to provide a shoreline fishing lure that is specifically configured to move in a sideways (lateral) pattern when reeled through a body of water.

Another object of this invention is to provide a shoreline fishing lure, as aforesaid, having a wire harness that may be coupled to a selected wire harness hole and a respective tie loop hole so as to move in a predetermined manner when reeled through a body of water, i.e., to move laterally along a shoreline.

Still another object of this invention is to provide a shoreline fishing lure, as aforesaid, that includes a weight system that selectively receives tungsten weight members so as to regulate a depth of movement when reeled.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is another perspective view taken from a lower angle of the fishing lure as in FIG. 1a;

FIG. 2a is an exploded view of the fishing lure as in FIG. 1a;

FIG. 2b is an isolated view taken on an enlarged scale from FIG. 2a;

FIGS. 5a to 5c are top, side, and end views, respectively, of the wire harness isolated according to the present invention;

DESCRIPTION OF THE PREFERRED EMBODIMENT

Figure 1A:
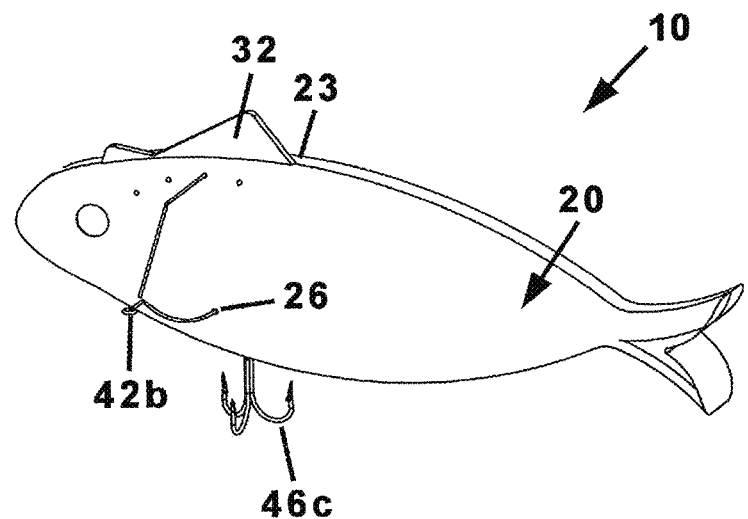
FIG. 1a is a perspective view of a shoreline fishing lure according to the present invention.
Figure 1B:
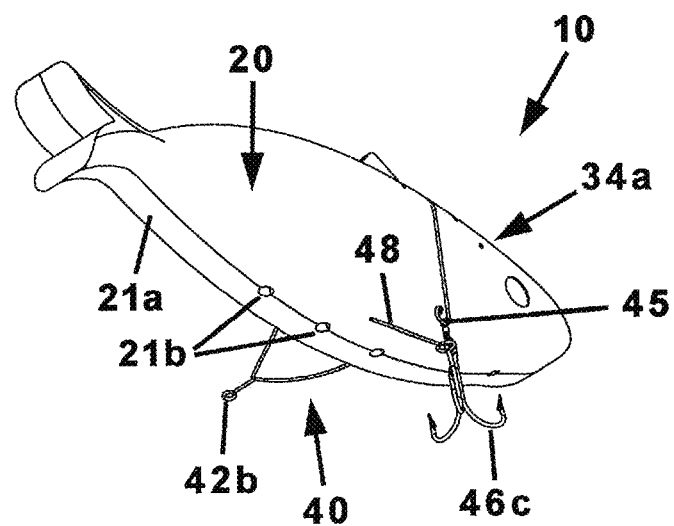

A shoreline fishing lure according to a preferred embodiment of the present invention will now be described with reference to the accompanying drawings. The shoreline fishing lure includes a lure body 20 defining a plurality of harness holes 34 spaced apart from one another and a plurality of slots 52 configured for receiving weight inserts 53, the lure including a wire harness 40 configured for attachment to a selected harness hole 34 and configured to promote lateral movement when the lure body 20 is pulled through a body of water.

The fishing lure 10 according to the present invention includes a lure body 20 having at least a pair of side portions 21 releasably coupled to one another. When coupled together, the pair of side portions 21 define a hollow interior area 24. Either the side portions 21 may be separated or, together, they define a slit 23 through which access to the interior area 24 may be had. More particularly, the pair of outside portions 21 may, together, define an upper wall or upper edge defining the slit 23 in communication with the interior area 24 and through which an insert member 30 may be removably positioned within the interior area 24. In other embodiments, by contrast, the lure body 20 may include only a half insert or no insert at all. Where a partial or no insert is utilized, it is understood that each side portion 21 may be constructed of or include a stiffener or may be constructed using a more rigid and less flexible material.

Further, an insert member 30 (which may also be referred to simply as an insert) may be positioned within the interior area 24. In an embodiment, the insert member 30 may be selectively removed and replaced with an insert member 30 having different characteristics. Preferably, the insert member 30 may have a configuration that is complementary to the side portions 21 of the lure body 20 so as to be received into the interior area 24 in a generally nested configuration. For clarity of reference later, the insert member 30 may include at least an upper edge 31a and a lower edge 31b generally opposite the upper edge 31a. In an embodiment, the insert member 30 may define a plurality of harness holes 34 generally adjacent one another and arranged in an arc proximate the front edge 31a. In an embodiment, the insert member 30 may include an upper section 32 that extends upwardly and outwardly through the slit 23 so as to be visible and accessible during use (FIG. 1a). As shown, it is the upper section 32 that defines the plurality of harness holes 34.

In one embodiment, however, the insert member 30 may have a singular construction with the side portions 21 and, thus, not be removable. In fact, the insert member 30 may include a material that has a predetermined rigidity that is permanently molded between the outside portions 21 such that the interior area of the body of the fishing lure has a solid construction. In this embodiment, the upper section 32 may be configured to extend upwardly from an upper edge of respective side portions 21. This upper section may still define the plurality of harness holes 34a as explained above with regard to an embodiment that includes the insert member 30 as will be explained below in more detail. The harness holes 34a defined by respective side portions 21 are preferably laterally adjacent one another and arranged in an arc or arched configuration near an upper edge thereof. The harness holes 34a may be generally aligned with the harness holes 34 of an insert member 30 or may operate independently in communication with the wire harness described below if no insert member 30 is incorporated in the design.

In addition, the pair of side portions 21 may each define an eye hole 26 adjacent respective bottom edges 21a. Preferably, each eye hole 26 is generally opposite or spaced apart from the plurality of harness holes 34 that is extending upwardly through the slit 23. Similarly, the insert member 30 may define a tie loop eye hole 36 adjacent its lower edge 31. It is understood that each eye hole 26 and tie loop eye hole 36 are in alignment. Alignment is critical for receiving respective components of the wire harness 40 as will be described later in more detail.

Each harness hole 34 is configured to selectively receive a fastener of the wire harness 40 according to the present invention. Importantly, attaching the wire harness 40 to different harness holes 34 may result in different movement or performance of the lure body 20. Stated another way, the position, orientation, and operation of the wire harness 40 is dependent upon water resistance encountered as the lure is pulled through a body of water as will be explained later in more detail.

A critical aspect of the present invention is that the shoreline fishing lure 10 includes a wire harness 40 that is literally constructed of a relatively small gauge metal wire that is flexible or bendable, such as stainless steel or titanium. The configuration of the wire harness 40 as well as the orientation of its attachment to the lure body 20 is critical to the lateral movement and depth of deployment of the fishing lure 10. The alignment of respective holes will now become clearer as details of the wire harness 40 are described in detail.

More particularly, the wire harness 40 may include an upper prong 42 (which may also be referred to as a first prong 42) having an elongate and linear configuration and a free end 42a (also referred to as a terminal end). In use, the upper prong 42 of the wire harness 40 may be extended through a selected harness hole 34. In an embodiment, the free end 42a may include a line connecting loop 42b which may then be coupled to the line of a rod and reel or other tackle. A connection to various harness holes 34 is shown in the figures.

Similarly, the wire harness 40 may include a lower prong 44 (which may also be referred to as a second prong 44) having an elongate and linear configuration and a free end 44a (also referred to as the terminal end). As shown, portions of the upper and lower prongs 42, 44 are parallel to one another although portions of each may be offset and directed toward one another.

Figure 2A:
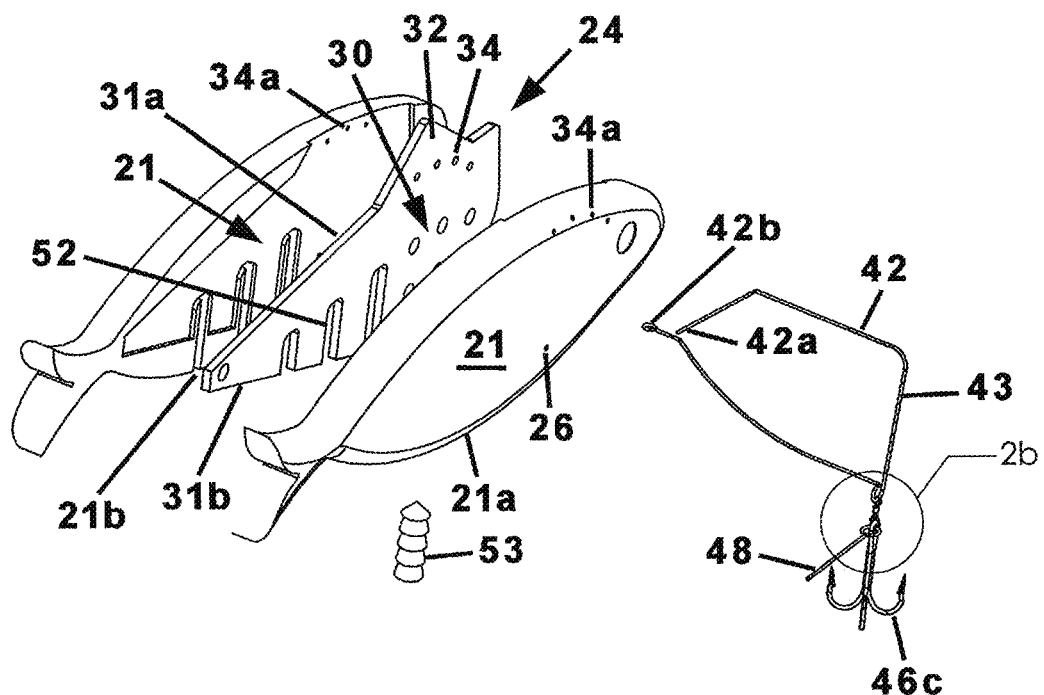
Figure 2B:
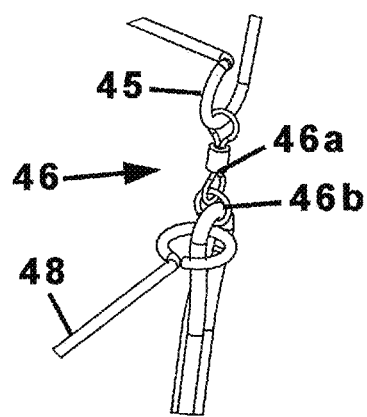
Figure 3A:
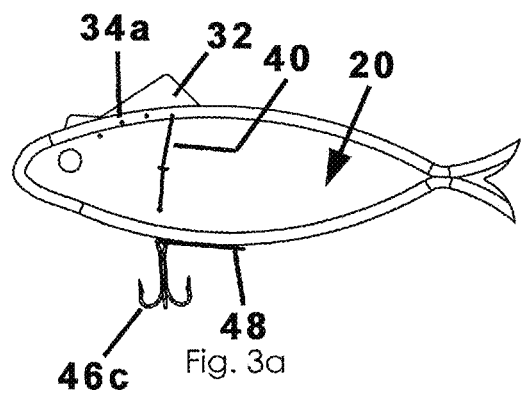
FIGS. 3a to 3d are a series of side views illustrating the wire harness coupled to each of a plurality of harness holes defined by an insert member according to the present invention.
Figure 3B:
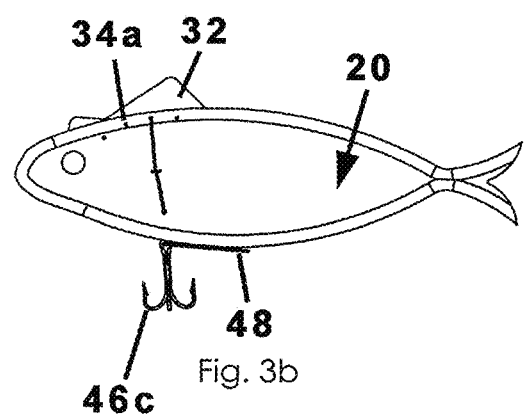
Figure 3C:
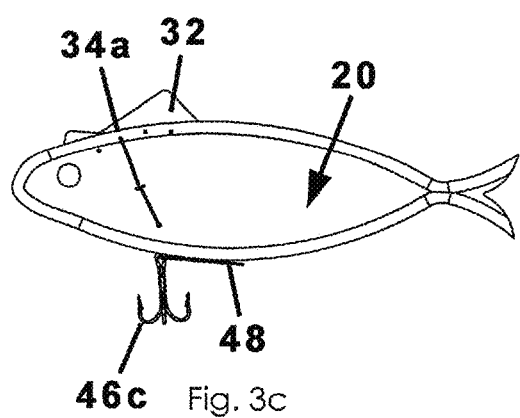
Figure 3D:
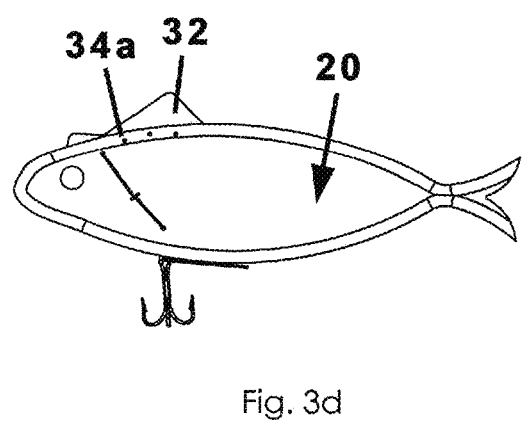
Figure 4A:
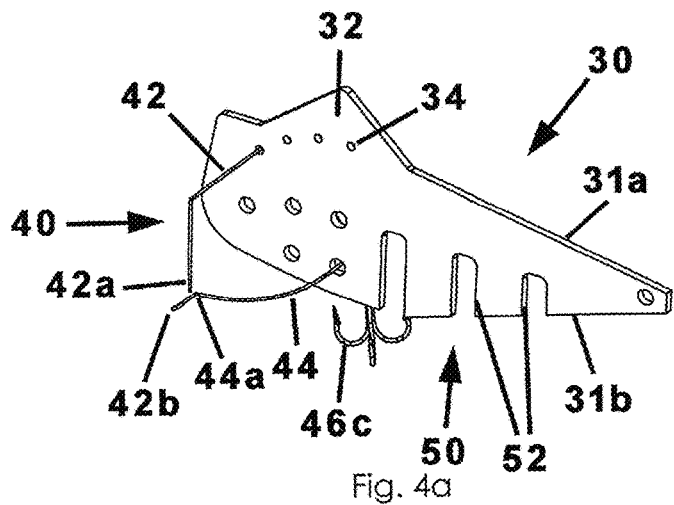
FIGS. 4a to 4c are side views illustrating attachment of a wire harness to the insert member of the fishing lure according to the present invention.
Figure 4B:
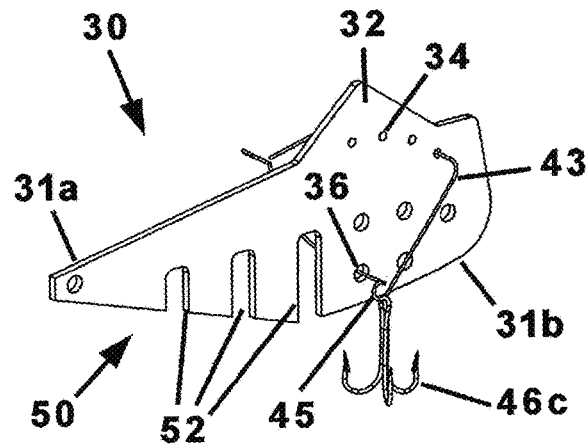
Figure 4C:
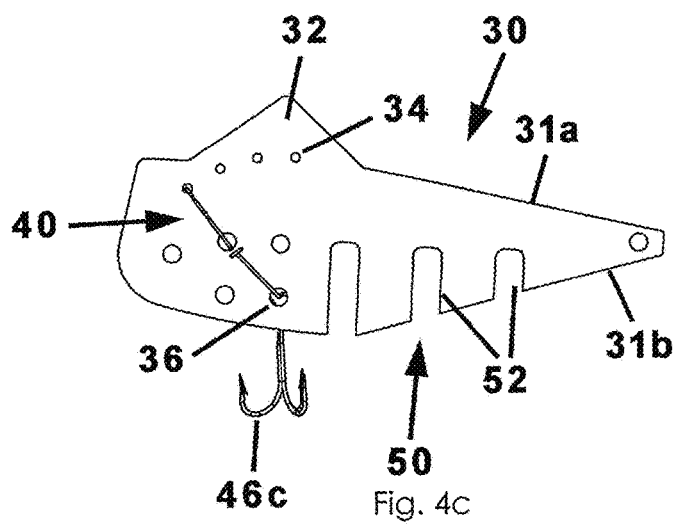
Figure 6:
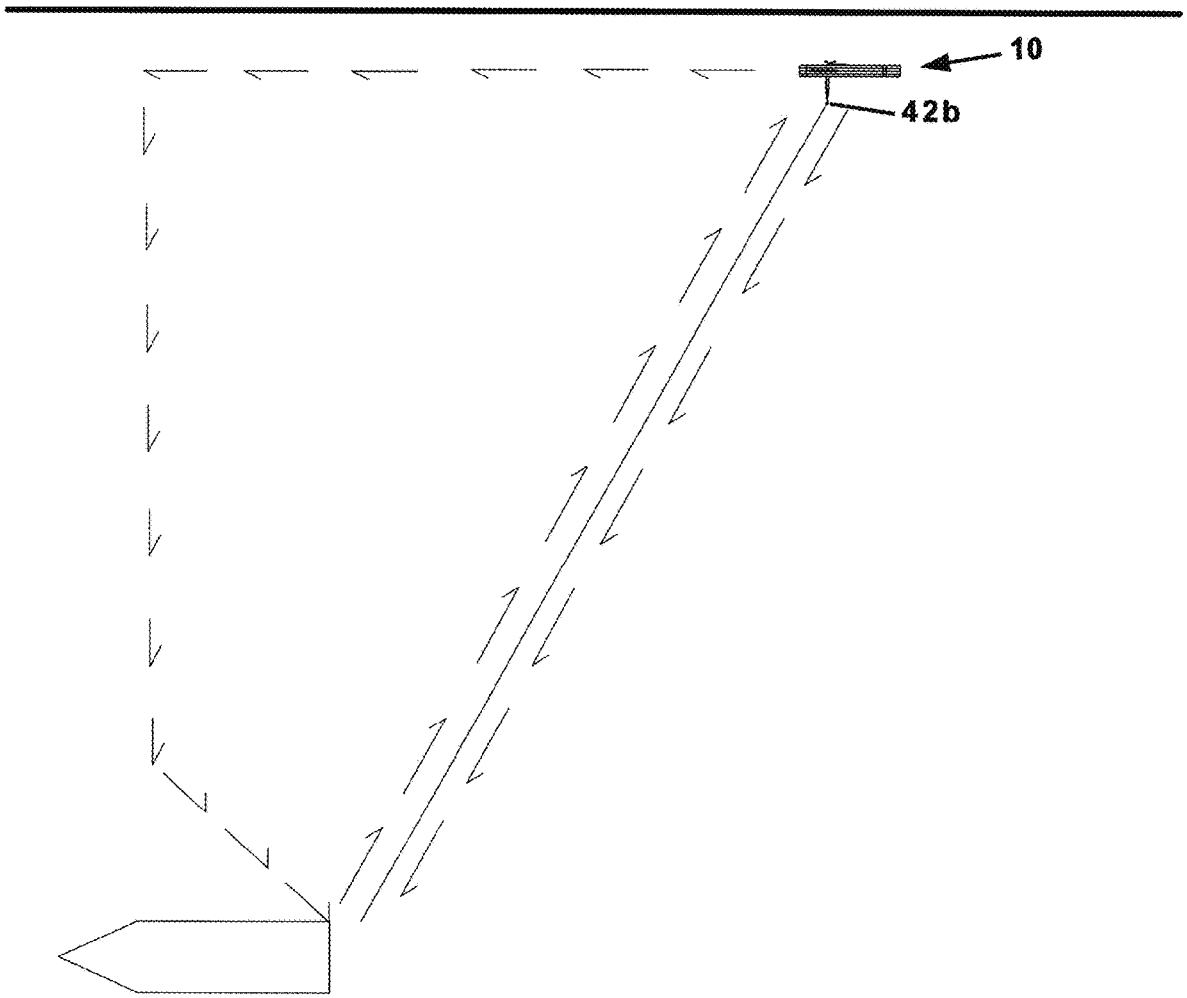
FIG. 6 is a diagrammatic illustration showing usage of the shoreline fishing lure.
Figure 7:
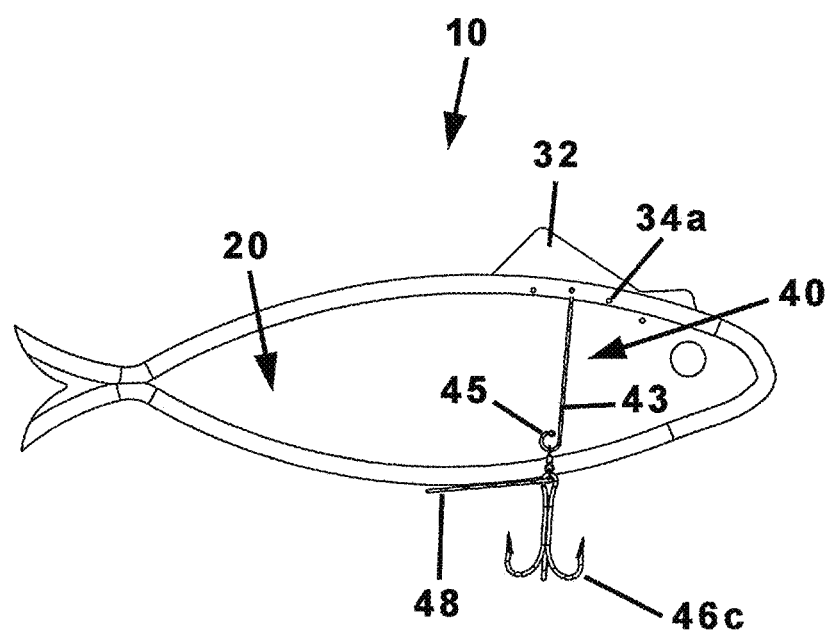
FIG. 7 is a side view of an embodiment of the shoreline fishing lure and, specifically, usage of the holding pin therewith according to the present invention.

In an embodiment, proximal ends of the first and second prongs 42, 44 may be connected by an intermediate section 43, the intermediate section 43 being generally perpendicular to the first and second prongs 42, 44 (FIG. 5b). In an embodiment, the wire harness 40 may include a joint 45 situated between the first and second prongs 42, 44 and, even more specifically, between the intermediate section 43 and second prong 44, having an R-shaped configuration. This joint 45 may also be referred to as an R-bend and will also be referred to by reference character 45. The R-bend 45 is functional for connection to a fishing rigging 46 that may include a line swivel 46a, split ring 46b, and a hook 46c (such as a treble hook) (FIGS. 2a and 2b). The rigging 46 may also include a holding pin 48 which may be utilized by a user to manipulate or push the hook 46c forwardly or rearwardly.

In another aspect, the shoreline fishing lure 10 may include a weight mechanism 50 that is configured to modify the lure body's buoyancy. More particularly, the lower edge 31b may define a plurality of slots 52, each slot 52 extending upwardly into the insert member 30 and having an interior space configured to receive all or a portion of a weight member 53 constructed of tungsten or an equivalent ballast device. Further, the pair of side portions 21 may include bottom edges 21a that, together, may define a plurality of apertures 21b, each aperture 21b defining a configuration that is complementary to receiving weight members 53, respectively. In an embodiment, it is understood that the plurality of apertures 21b are aligned or registered with the slots 52 such that respective weight members 53 are received without unintended blockage. Further, in the embodiment not having an insert member (described earlier), the weight members 53 may be received into respective apertures 21b and essentially driven into the solid-core body as opposed to into corresponding slots 52 described earlier in this paragraph.

In use, an insert member 30 having a desired configuration of the plurality of harness holes 34 and weight mechanism slots 52 may be selected by a user and inserted into the interior area 34 of the lure body 20. Then, a wire harness 40 may be coupled to the insert member 34, more particularly, the first prong 42 may be extended through a selected/desired harness hole 34 and the second prong 44 extended through the eye hole 26 and corresponding tie loop hole 36. Finally, respective tackle may be attached as described above. Once configured in this manner, the lure may be connected to the rod and reel in a traditional fashion and cast out near a shoreline or other obstacle and incrementally reeled back in, the reeling motion resulting in the lure traveling laterally along the shoreline.

It is understood that while certain forms of this invention have been illustrated and described, it is not limited thereto except insofar as such limitations are included in the following claims and allowable functional equivalents thereof.

What is claimed is:

1. A fishing lure that moves laterally when pulled through a body of water, the fishing lure comprising:
    a lure body having a pair of side portions that, together, define an interior area and an upper slit in communication with said interior area;
    an insert member positioned in the interior area of the lure body and having an upper section extending upwardly through said upper slit, the upper section of said insert member defining a plurality of harness holes arranged adjacent one another along an upper edge of the insert member; and
    a wire harness having an upper prong selectively extending through a selected harness hole of the plurality of harness holes, the wire harness having a predetermined contoured configuration that, when attached to said selected harness hole, modifies a direction and movement of the lure body in response to water resistance;
    wherein said insert member includes a lower edge that defines a plurality of slots adjacent to and spaced apart from one another, each slot of said plurality of slots being configured to selectively receive a weight member therein so as to alter a buoyancy and movement characteristics of said lure body;
    wherein said pair of side portions of said lure body include bottom edges that, together, define a plurality of apertures aligned with said plurality of slots, each aperture of said plurality of apertures being configured to receive respective weight members into respective slots of insert member.

2. The fishing lure of claim 1, wherein the wire harness is constructed of a flexible material configured to induce lateral movement of the lure body when pulled through the water.

3. The fishing lure of claim 1, wherein:
    each side portion of said pair of side portions define an eye hole adjacent a respective bottom edge of each side portion of said pair of side portions;
    said insert member defines a tie loop eye hole aligned with said eye holes of said pair of side portions when said insert member is positioned within said interior area; and
    said wire harness includes a lower prong extending through said eye holes and said tie loop eye hole, respectively.

4. The fishing lure of claim 3, wherein said wire harness defines a joint positioned between said upper and lower prongs that has an R-shaped configuration, portions of said upper and lower prongs being parallel to one another.

5. The fishing lure of claim 4, wherein said lower prong includes a free end having a line attachment eye for attachment to a fishing line.

6. The fishing lure of claim 4, wherein said joint has a configuration selectively coupled to a fishing hook.

7. A fishing lure that moves laterally when pulled through a body of water, the fishing lure comprising:
    a lure body having a pair of side portions that, together, define an interior area and an upper slit in communication with said interior area;
    an insert member positioned in the interior area of the lure body and having an upper section extending upwardly through said upper slit, the upper section of said insert member defining a plurality of harness holes arranged along front and upper edges of the insert member;
    wherein said insert member includes a weight mechanism proximate a lower edge of said insert member that is configured to selectively modify a buoyancy of the lure body;
    a wire harness having an upper prong selectively extending through a selected harness hole of the plurality of harness holes, the wire harness having a predetermined contoured configuration that, when attached to the selected harness hole of the plurality of harness holes, modifies a direction and movement of the lure body in response to water resistance;
    wherein the weight mechanism includes a plurality of slots adjacent to and spaced apart from one another along said lower edge of the insert member, each slot of the plurality of slots configured to selectively receive a weight member therein so as to alter the buoyancy and movement characteristics of the lure body;
    wherein said pair of side portions of said lure body include bottom edges that, together, define a plurality of apertures aligned with said plurality of slots, each aperture of said plurality of apertures being configured to receive respective weight members into respective slots of said weight mechanism.

8. The fishing lure of claim 7, wherein the wire harness comprises a flexible material configured to induce lateral movement of the lure body when pulled through the water.

9. The fishing lure of claim 7, wherein:
    each side portion of said pair of side portions define an eye hole adjacent a respective bottom edge of each side portion of said pair of side portions;
    said insert member defines a tie loop eye hole aligned with said eye holes of said pair of side portions when said insert member is positioned within said interior area; and
    said wire harness includes a lower second prong extending through said eye holes and said tie loop eye hole, respectively.

10. The fishing lure of claim 9, wherein the plurality of harness holes provides selective attachment points for the upper prong of the wire harness, each attachment point of the attachment points resulting in a different lateral movement pattern when the lure is pulled through the water.

11. The fishing lure of claim 9, wherein said wire harness defines a joint positioned between said upper and lower prongs that has an R-shaped configuration, portions of said upper and lower prongs being parallel to one another.

12. The fishing lure of claim 11, wherein said lower prong includes a free end having a line attachment eye for attachment to a fishing line.

13. The fishing lure of claim 11, wherein said joint has a configuration for receiving a fishing hook.

14. The fishing lure of claim 7, wherein the insert member is positioned within the interior area of the lure body to allow for interchangeability of insert members having slot and harness hole configurations that are different from each other.

* * * * *